(12) United States Patent
Sugaya

(10) Patent No.: US 6,714,801 B1
(45) Date of Patent: Mar. 30, 2004

(54) RADIO TRANSMISSION CONTROL METHOD AND RADIO TRANSMISSION DEVICE

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 09/650,714

(22) Filed: Aug. 30, 2000

(30) Foreign Application Priority Data

Sep. 1, 1999 (JP) .......................................... P11-247617

(51) Int. Cl.$^7$ ................................................ H04B 7/14
(52) U.S. Cl. ........................ 455/574; 955/575; 955/522
(58) Field of Search ................................ 455/574, 500, 455/502, 507, 509, 510, 515, 517, 208, 14, 15, 575, 522, 523, 282; 370/235, 346

(56) References Cited

U.S. PATENT DOCUMENTS

| | | | | | |
|---|---|---|---|---|---|
| 4,970,506 A | * | 11/1990 | Sakaida et al. | ........... | 340/825.2 |
| 5,241,542 A | * | 8/1993 | Natarajan et al. | ........... | 370/311 |
| 5,537,460 A | * | 7/1996 | Holliday et al. | ............ | 455/435 |
| 5,793,307 A | * | 8/1998 | Perreault et al. | .......... | 340/825.5 |
| 5,828,663 A | * | 10/1998 | Ikegami | ....................... | 370/347 |
| 6,067,458 A | * | 5/2000 | Chen | ............................ | 455/522 |
| 6,085,114 A | * | 7/2000 | Gibbons et al. | ............ | 455/574 |
| 6,144,840 A | * | 11/2000 | Alton et al. | .............. | 455/343.3 |
| 6,335,923 B2 | * | 1/2002 | Kubo et al. | .................. | 370/335 |
| 6,445,283 B1 | * | 9/2002 | Pang et al. | ................. | 340/10.2 |
| 6,480,476 B1 | * | 11/2002 | Willars | ........................ | 370/311 |
| 6,490,459 B1 | * | 12/2002 | Sugaya et al. | .............. | 455/517 |
| 6,493,545 B1 | * | 12/2002 | Sugaya | ........................ | 455/272 |

* cited by examiner

*Primary Examiner*—Cong Van Tran
(74) *Attorney, Agent, or Firm*—Jay H. Maioli

(57) ABSTRACT

A method and device whereby it is possible to transmit necessary information by using a minimum of radio transmission channels in a radio transmission network. In order that a network system using radio waves can coexist with other communication systems, the network system usually operates in a dormant state. If the network system has detected a possibility of information transmission on a radio transmission channel based on behavior of a connected device or on a transmission channel for the device, then the network system constructs a radio network in advance prior to radio transmission and comes in an operational state. In asynchronous radio transmission channels, a polling operation from a control station to each of peripheral terminal stations on a network is not executed and information transmission is not conducted, in a steady state. If a transmission demand has occurred in any peripheral terminal station, then the peripheral terminal station transmits a polling request signal to a control station and causes a polling operation from the central control station to be started.

3 Claims, 12 Drawing Sheets

RADIO TRANSMISSION CONTROL METHOD AND RADIO TRANSMISSION DEVICE

BACKGROUND OF THE INVENTION

1. Field of the Invention

The present invention relates to a radio transmission access method suitable for, for example, such a case where various kinds of information are transmitted by using radio signals and a local area network (LAN) is formed among a plurality of devices, and a radio transmission device for conducting transmission by using this access method.

2. Description of the Related Art

Conventionally, in the case where a local area network is formed among a plurality of devices, such as various kinds of video devices, personal computer devices, and their peripheral devices, in a comparatively narrow range such as home or an office so as to be capable of transmitting data handled by those devices, data transmission is sometimes performed with radio transmission by connecting a radio signal transmission and receiving device (radio transmission device) to each device instead of directly connecting devices with some signal lines.

By forming a local area network as a system for performing radio transmission, it is not necessary to connect devices directly by using signal lines and the system configuration can be simplified.

In the case where a plurality of radio transmission devices are prepared and a local area network is formed, there is a risk of occurrence of transmission errors if signals are simultaneously transmitted from a plurality of radio transmission devices by using the same transmission band. Therefore, it is necessary to conduct access control on communication of transmission devices in the network by using some method.

Examples of the access control method heretofore known will now be described. For example, for a small-scale radio network, there is such a method that communication among transmission devices (peripheral terminal stations) in the network is unitarily managed by a transmission device (central control station) located in a center portion of star connection. To be concrete, there is considered such processing that transmission of data from another transmission device peripheral terminal station) is controlled by polling control from the transmission device (central control station) located in the center portion.

As a different access method, there is such a method that in, for example, a small-scale radio network, each communication station establishes a connection link between it and a communication station located around it and each communication station performs asynchronous communication as occasion demands. To be concrete, there is considered access control processing in which a certain communication station ascertains beforehand that transmission is not being conducted by another communication station and starts information transmission so as not to collide with another communication station in transmission state.

In access control processing in which information transmission is started so as not to cause a collision in transmission state with another communication station, it is necessary to conduct transmission and reception of information concerning communication stations existing in peripheral regions and information concerning position relations of those communication stations prior to information transmission and thereby establish in advance such a state that a network has been formed.

For example, in the case where polling from a transmission device (central control station) located in the central portion is conducted, a central control station needs to always transmit a polling signal onto the network. There is a fear that transmission of the polling signal may obstruct operation of other network systems.

In the case where such a method that a central control station unitarily manages communication, a radio wave is transmitted only when radio transmission has become necessary, and consequently the possibility of coexistence with other communication systems is increased. If a plurality of communication stations conduct information transmission at arbitrary timing, however, there is a risk of occurrence of a collision. Therefore, it is necessary to ascertain the network state when an information transmission request has occurred and secure a radio transmission channel in advance prior to transmission. This results in a problem that it takes a long time until actual information transmission.

On the other hand, in the case of such a method that communication stations conduct asynchronous communication as occasion demands, for control informations transmitted from each communication device not to occur a collision each other, the central control station needs to always send polling signals to peripheral terminal stations. The peripheral terminal stations also need to reply to the polling signals as occasion demands. Even in the case where there is no information to be transmitted, therefore, radio transmission channels are occupied.

In the peripheral terminal stations, it is also possible to adopt such a power saving system configuration that a reply is not given to a polling signal for setting that there is not a demand for transmission. In the control station, however, polling signals must be always transmitted, and consequently the power dissipation becomes enormous. In addition, it cannot be avoided on the network to interfere with other communication systems.

SUMMARY OF THE INVENTION

In view of these points, an object of the present invention is to make it possible to transmit necessary information by using a minimum of radio transmission channels in such a radio transmission network.

In accordance with a first aspect of the present invention, a network system using radio waves usually operates in a dormant state so as to be capable of coexisting with other communication systems. If the network system has detected a possibility of information transmission on a radio transmission channel based on behavior of a connected device or on a transmission channel for the device, then the network system constructs a radio network in advance prior to radio transmission and comes in an operational state.

According to the first aspect of the present invention, the radio network comes in a dormant state when information transmission in the radio network is not required only when there is a possibility of information transmission, the radio network comes in an operational state. By minimum operation of the radio network, necessary information transmission is conducted.

In accordance with a second aspect of the present invention, polling operation from a control station to each of peripheral terminal stations on a network is not executed and information transmission is not conducted, in a steady state of asynchronous radio transmission channels. If a transmission demand has occurred in any peripheral terminal station, then the peripheral terminal station transmits a polling request signal to a control station and causes polling operation from the central control station to be started.

According to the second aspect of the present invention, polling operation is conducted only when there is a possibility that each of the stations included in the radio network transmits information. With minimum polling operation, necessary information transmission is conducted.

DETAILED DESCRIPTION OF THE PREFERRED EMBODIMENTS

Figure 1:
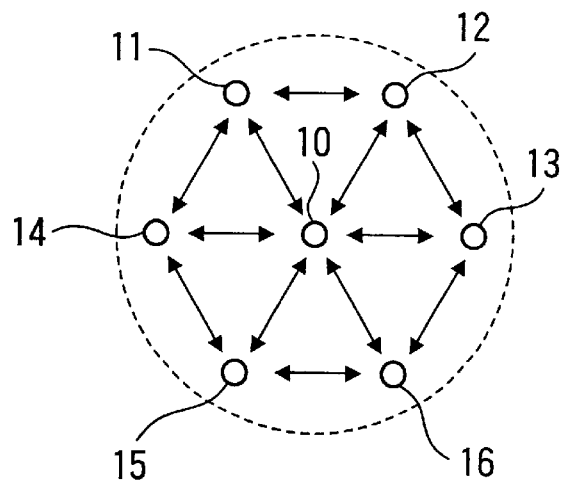
FIG. 1 is a diagram showing an example of a network configuration in an embodiment according to the present invention.

Hereafter, an embodiment of the present invention will be described by referring to the drawing.

First of all, a radio network configuration to which the embodiment is applied will be described. For example, as shown in FIG. 1, a central control station 10 is disposed nearly in the center of a range in which a radio network system is formed. In such a range that direct radio communication with the central control station 10 is possible, a plurality of peripheral terminal stations 11 to 16 are disposed. A so-called star network configuration is thus formed. Radio communication devices forming the central control station 10 and the terminal stations 11 to 16 basically have the same configuration. The central control station 10 differs from the terminal stations 11 to 16 in that the central control station 10 additionally has a configuration for conducting control operation required for the central control station. Between stations connected by each of double-arrowhead lines in FIG. 1, direct communication is possible. In the configuration shown in FIG. 1, direct radio communication is possible basically only between adjacent stations. In the case where information is to be transmitted to a station other than adjacent stations, relay transmission in another station is necessary. In the ensuing description, the term "communication station" means both the central control station (control station) and a peripheral terminal station (terminal station).

Figure 2:
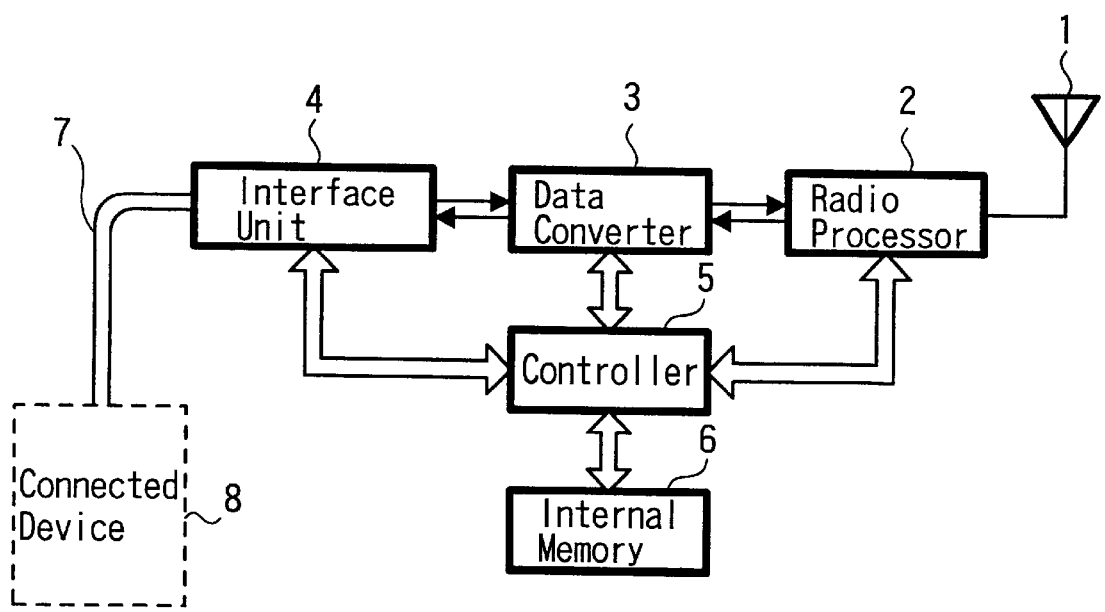
FIG. 2 is a block diagram showing an example of a transmission device in an embodiment according to the present invention.

FIG. 2 shows a configuration example of a radio transmission device forming each station. An antenna 1 for conducting radio transmission and reception is connected to a radio processor 2. A signal received by the antenna 1 is subjected to reception processing in the radio processor 2. A resultant intermediate frequency signal or a baseband signal is supplied to a data converter 3. The data converter 3 converts the intermediate frequency signal or the baseband signal to data of a necessary form, extracts required data from the data, and supplies the extracted data to an interface unit 4. An external device 8 is connected to the interface unit 4 via a serial bus line 7 of a predetermined form. The interface unit 4 transmits received data to the device 8.

Furthermore, data supplied from the device 8 via the serial bus line 7 is received by the interface unit 4. Data obtained at the interface unit 4 is converted in the data converter 3 to data of a radio transmission form. The converted data is supplied to the radio processor 2. In the radio processor 2, processing for transmission is conducted and radio transmission of the data is converted by the antenna 1.

As for the processing of radio signal transmission and reception conducted in the radio processor 2, for example, the OFDM (Orthogonal Frequency Division Multiplex) scheme and a transmission scheme using a multicarrier signal are used. As for the frequency used for transmission and reception, a very high frequency band such as 5 GHz band is used. As for the transmission output, for example, a comparatively weak output is set. For example, in the case where the device is used indoors, the output is set to such a value that radio transmission of a comparatively short distance in the range of several meters to several tens meters can be conducted.

As for the serial bus line 7 for connecting the main body of the radio transmission device to the device 8, a general purpose bus line capable of performing high speed transmission, such as a bus of IEEE 1394 scheme, is used. As for the device 8 connected by the bus line 7, various devices such as a video device, an audio device, or a computer device can be connected. Various data used in these devices such as video data, audio data, text data, or program data are radio-transmitted via the radio transmission device.

The transmission and reception processing conducted in the radio processor 2 of the radio transmission device, conversion processing conducted in the data converter 3, and interface processing conducted in the interface unit 4 are executed under the control of the controller 5 formed of, for example, a microcomputer. In the controller 5, an internal memory 6 having a control program and so on stored therein is incorporated. If in this case the signal received by the radio processor 2 is a signal for controlling the communication, then the received signal is supplied to the controller 5 via the data converter 3, and the controller 5 sets various components in states indicated by received control signals. Furthermore, a control signal transmitted from the controller 5 to another transmission device is also supplied from the controller 5 to the radio processor 2 via the data converter 3 and radio-transmitted.

In the case of the embodiment, control information which concerns bringing the network into a dormant state is included as control signals exchanged with another transmission device in the network via the controller 5. Details of the processing for bringing the network into the dormant state will be described later. In order to conduct processing for bringing the network into the dormant state, a connection environment operation flag is set in the controller 5 of each of radio transmission devices forming the network. In the embodiment, the transmission state on the serial bus line 7 connected to the interface unit 4 and the operation state of the device 8 connected via the bus line 7 are detected by the interface unit 4, and the detected information is distinguished by the controller 5. On the basis of the distinguished state, the connection environment operation flag is set to ON or OFF, and control concerning the above described dormant state of the network is effected.

Figure 3:
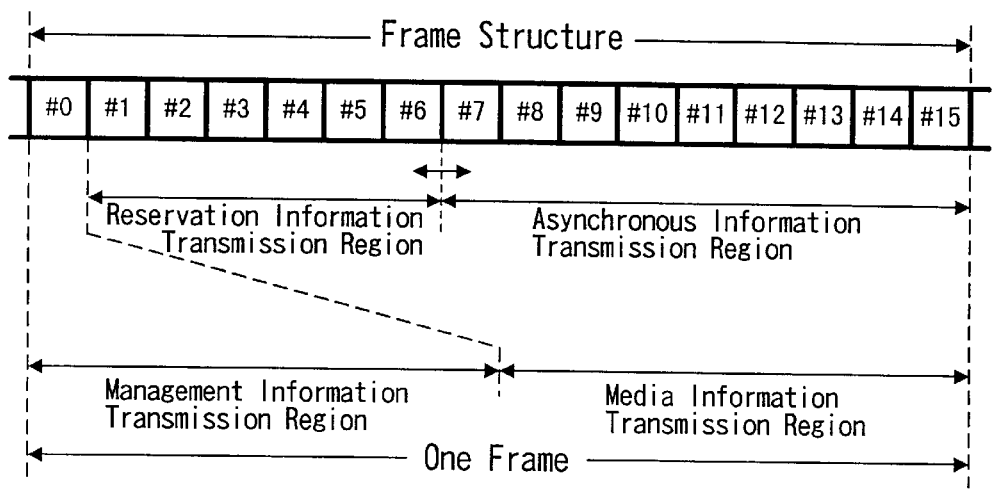
FIG. 3 is a diagram showing an example of a frame structure in an embodiment according to the present invention.

The state of a radio signal transmitted in the radio network of the example will now be described. In the example, for example, a frame period is prescribed, and information is transmitted by using a slot set in the frame period. This frame period is set by, for example, a radio transmission device forming the central control station 10. FIG. 3 is a diagram showing a frame period setting example. For example, 16 slots in the range of #0 to #15 are set in one frame. The first slot #0 is used for transmission control in the network as a management information transmission region. The remaining slots #1 to #15 are used for actually transmitting various kinds of information as a media information transmission region.

In the media information transmission region, two regions: a reservation information transmission region and a asynchronous information transmission region are set. In the reservation information transmission region, a band is reserved beforehand and slots are used to transmit information. In the asynchronous information transmission region, asynchronous information is transmitted. The reservation information transmission region is a region to be used when transmitting information of a comparatively large capacity, such as video information and audio information, in real time. In the reservation information transmission region is a region, transmission is reserved by taking a slot as the unit. The asynchronous information transmission region is used in the case where a control command or the like is positively transmitted. As for the transmission in the asynchronous information transmission region, information transmission is started after carrier sensing has been performed for a fixed time in, for example, each communication station. Or transmission control is effected by polling operation from the central control station. In the media information transmission region, slots reserved as the reservation information transmission region (slots #1 to #6 in the example of FIG. 3) become the reservation information transmission region, and remaining slots (slots #7 to #15 in the example of FIG. 3) become the asynchronous information transmission region. Therefore, the number of slots used as the reservation information transmission region and the number of slots used as the asynchronous information transmission region within one frame are set variably.

Figure 4:
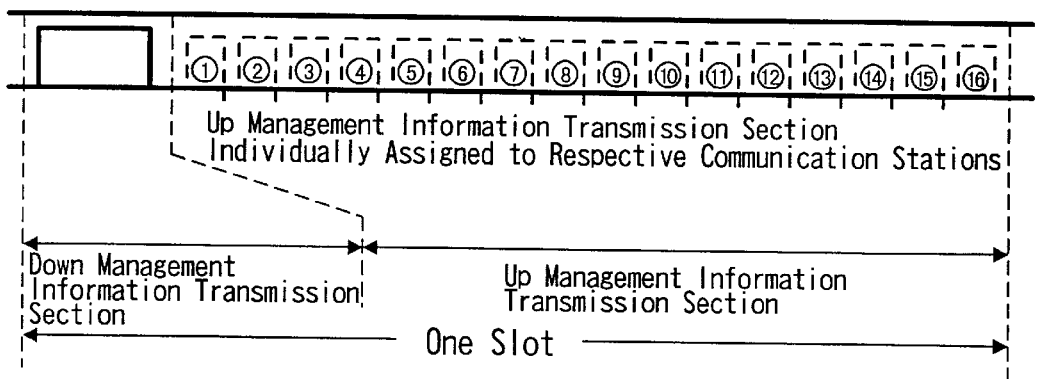
FIG. 4 is a diagram showing an example of an information transmission format in an embodiment according to the present invention.

FIG. 4 shows the structure of the one slot used as the management information transmission region (slot #0 in FIG. 3). In the section of one slot, a down management information transmission section from the central control station and an up management information transmission section from each of peripheral terminal stations in the network are set. In the up management information transmission section, sections assigned to every peripheral terminal stations in the network station are set. In the example of FIG. 4, the up management information transmission section is divided into 16 packets and one packet is assigned to one terminal station. In this example, up to 16 terminal stations can be set in one network. In this way, one frame is divided into the information transmission region and the management information transmission region, and the management information transmission region is divided into the transmission section of down management information and the transmission section of up management information. By using one prepared radio transmission channel, therefore, it becomes possible to exchange the control information efficiently without disturbing the information transmission in the information transmission region.

Figure 5:
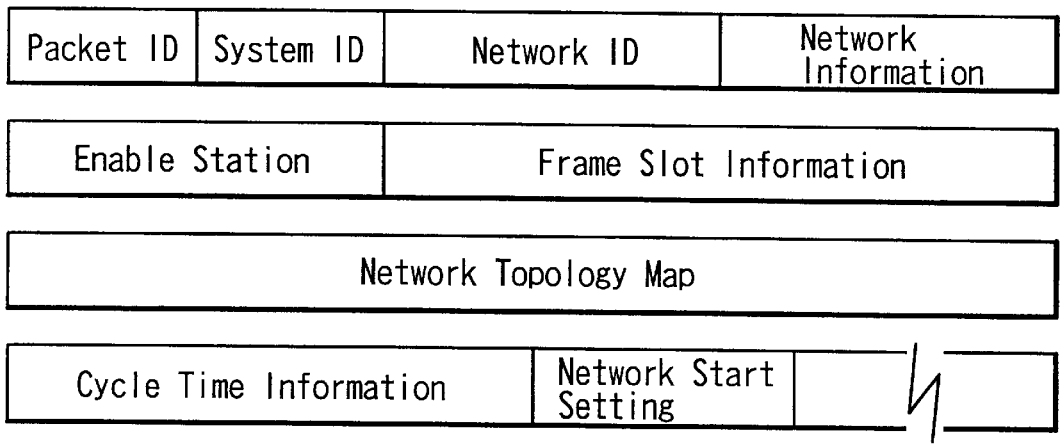
FIG. 5 is a diagram showing an example of data transmitted as down management information in an embodiment according to the present invention.

FIG. 5 shows an example of information transmitted in the down management information transmission section. In this example, the information includes a packet ID, a system ID, a network ID, network information, an enable station ID, frame slot information, network topology map information, cycle time information, and network start setting information, in the cited order from the head.

Each information will now be described. The packet ID is information representing the kind of a packet to be transmitted. The system ID is an identification number provided to this communication system. The network ID is an identification number peculiar to this radio network. The network information is information used for mutual authentication or the like within the radio network system. The enable station ID is information indicating operating communication stations among communication stations forming this radio network. The frame slot information is information representing the slot assignment situation and slot utilization situation in the frame. The network topology map information is information indicating the mutual connection situation in a communication station included in the radio network. The cycle time information is time information of, for example, the serial bus line connected to the radio transmission device. The network start setting information is information for starting a dormant communication station in the network. Other information is transmitted in the down management information transmission section in some cases. Furthermore, all information is not disposed in one packet in some cases. Information transmitted from the central control station in the down management information transmission section is basically received and distinguished by all peripheral terminal stations in the network.

Figure 6:
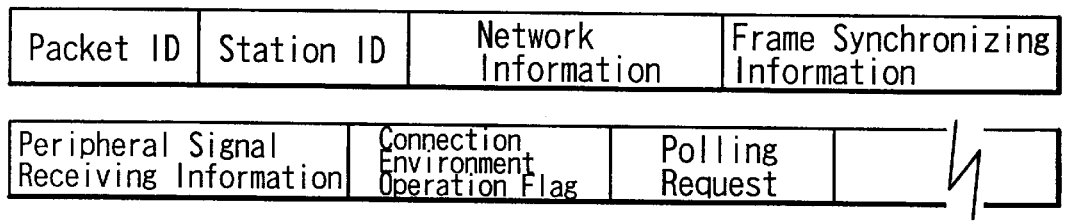
FIG. 6 is a diagram showing an example of data transmitted as up management information in an embodiment according to the present invention.

FIG. 6 shows an example of information transmitted in the up management information transmission section. An example of data of one packet assigned to each terminal station is shown. In this example, the data includes a packet ID, a station ID, network information, frame synchronizing information, peripheral station signal receiving information, a connection environment operation flag, and polling request information, in the cited order from the head.

Each information will now be described. The packet ID is information representing the kind of a packet to be transmitted. The station ID is information of an identification ID provided to each communication station. The network information is information used for mutual authentication or the like within the radio network system. The frame synchronizing information is frame synchronizing information exchanged between stations within the network. The peripheral station signal receiving information is information concerning a communication station from which data can be received at that station. To be concrete, the peripheral station signal receiving information is information generated, for example, one frame earlier on the basis of the receiving state of up management information from a communication station existing in the peripheral region. The connection environment operation flag is information indicating that a device (corresponding to the device 8 in FIG. 2) connected to that communication station is in its operation state. The setting state of that flag in the communication station is transmitted. The polling request information is information requesting the control station to conduct polling. Other information may be transmitted. Furthermore, it is not necessary to transmit the whole of such information in one packet.

Figure 7:
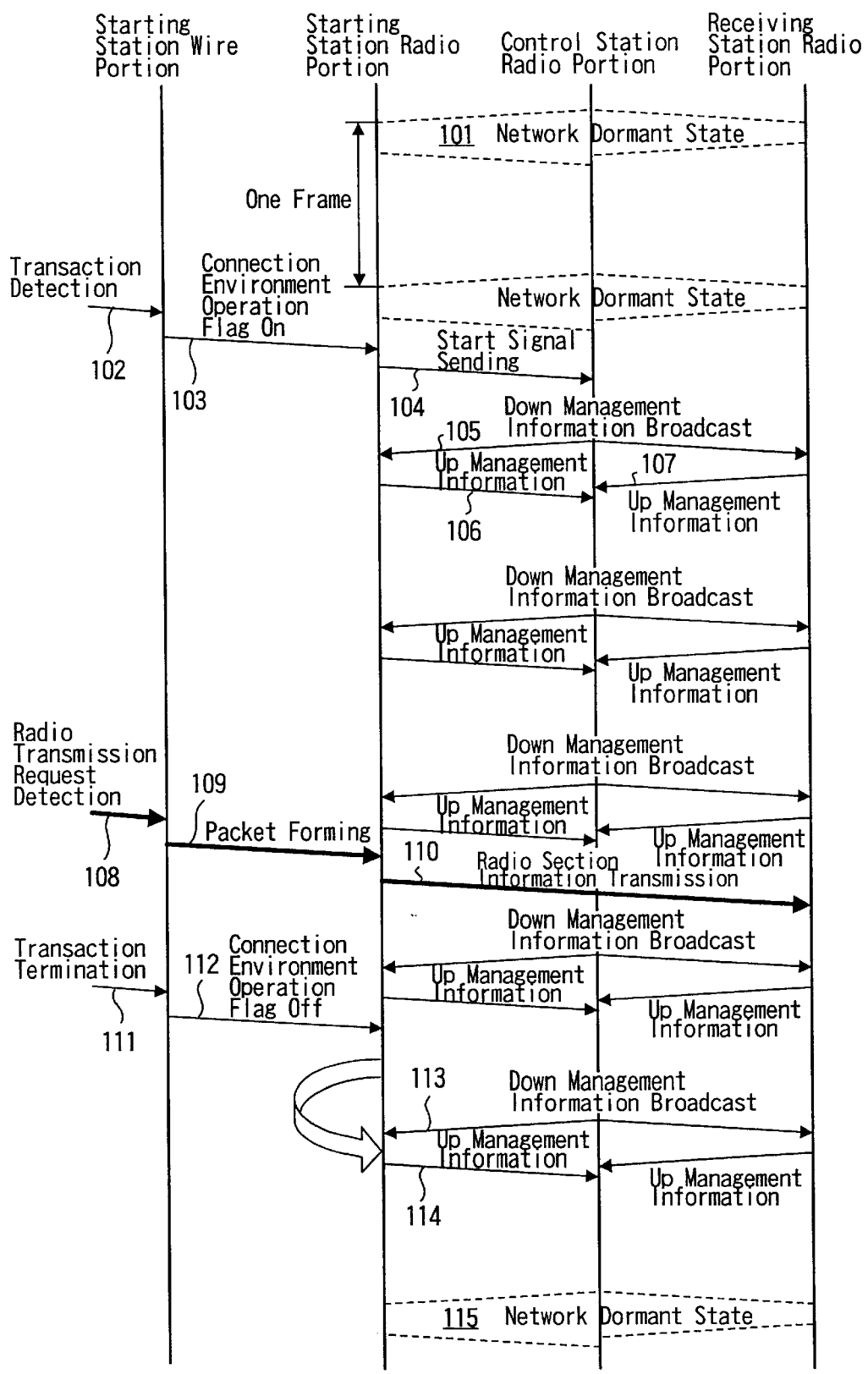
FIG. 7 is a time chart showing a first transmission example in an embodiment according to the present invention.
Figure 8:
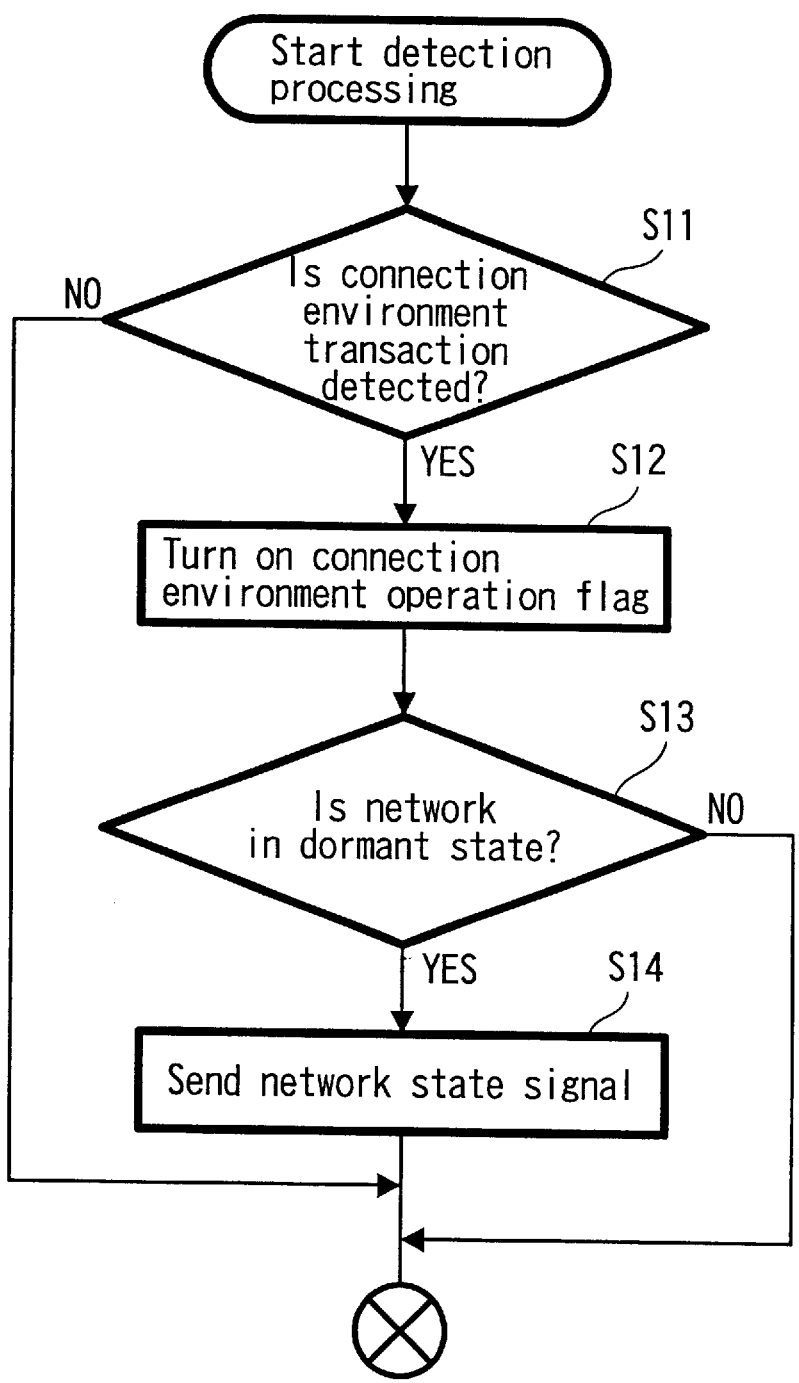
FIG. 8 is a flow chart showing an example of start processing in a first transmission example in an embodiment according to the present invention.

An example of transmission of a radio signal according to the embodiment in the network having such a configuration will now be described. FIG. 7 is a diagram showing a communication state according to a first transmission control example. In the example shown in FIG. 7, information is radio-transmitted from one terminal station to another terminal station under the control of the central control station. In FIG. 7, there is also shown the state of a wire portion (corresponding to the interface section 4 of FIG. 2) for receiving a signal from a device supplied with information, in a terminal station which transmits information. It is assumed that respective communication stations in the network have already been registered with the control station via predetermined authentication processing and in addition various kinds of information such as station IDs of respective communication stations in the network have been registered with respective communication stations before the transmission shown in FIG. 7 is started.

First of all, in a first state shown in FIG. 7, the network is in a dormant state 101. As represented by broken lines in FIG. 7, broadcast of the management information from the control station which originally requires transmission in frame periods is not conducted. Even in the dormant state, however, the control station waits in a state ready to receive a start signal from each terminal station, and each terminal station waits in a state ready to receive the down management information broadcasted from the control station. It is assumed in this state that some transaction 102 occurs in a wire portion connected to a certain communication station and the transaction 102 is detected in the control section within the communication station. As this transaction, for example, some signal has been transmitted or a state change of a connected device has been detected on a serial bus line forming a wire transmission line. The transaction corresponds to detection of a stage before actual transmission of various kinds of information. At this time, the control section within this communication station gives an order 103 of transmission of a signal indicating that the connection environment operation flag has changed to ON. On the basis of the order, a start signal 104 including the pertinent information is transmitted to the control station. At the time of transmission of the start signal 104, carrier sensing is conducted for a prescribed time and radio transmission to the control station is conducted so that a fault will not occur on a radio transmission channel.

Upon receiving this start signal 104, the control station immediately conducts processing for starting this radio network system. In other words, the control station conducts broadcast processing of the down management information 105 and makes the radio network operate. As a result of this transmission of the down management information 105, in succession up management information 106 and 107 are transmitted from respective terminal stations within the network. In the started state, transmission of the down management information 105 and transmission of the up management information 106 and 107 are repeated at intervals of the frame period. Connection of the radio network is thus established.

When an information transmission request 108 through the radio network has occurred in a wire portion connected to an operating terminal station, a transmission packet 109 is fomed for a radio portion of that station, and conducts radio transmission 110 of the formed packet toward the other terminal station at such timing that the transmission packet may be transmitted on a radio transmission channel. At this time as well, it is possible to conduct carrier sensing for a prescribed time and thereby conduct processing so as not to cause a collision with another signal on the transmission channel. Furthermore, it is also possible to reserve a radio transmission band beforehand and transmit the packet in the reserved band.

When a wire portion of the starting terminal station has detected termination 111 of the transaction, there is given an order 112 indicating that the connection environment operation flag of management information transmitted from the radio section has been turned off under the control of the control section of that station. At the time of transmission of up management information 114 which follows broadcast of down management information 113 in the next frame period, pertinent information (i.e., OFF information of the connection environment operation flag) is transmitted. Upon receiving this information, the control station suspends the broadcast transmission of down management information and brings the radio network into a dormant state 115.

The control station may be set so as to bring the radio network into the dormant state even in the case where the transmitted information of the connection environment operation flag does not become OFF or in the case where there is a communication station disappearing from the radio network.

In the example of FIG. 7, detection of some transaction 102 and detection of the radio transmission request 108 are conducted at different time points. Even in the case where they are detected at the same time, however, radio transmission of information can be conducted in the same way by conducting the processing in order consecutively.

Examples of processing states in each communication station in the case where the above described transmission processing is executed will now be described by referring to flow charts of FIGS. 8 to 11. First of all, processing conducted in the starting communication station will now be described by referring to the flow chart of FIG. 8. In this communication station, it is determined whether occurrence of a transaction in a device connected to a radio transmission device or in a wire environment connected to such a device has been detected (step S11). In other words, for example, when power is supplied to the connected device, or when information is transmitted on the serial bus line, it is determined whether any transaction has been detected. In the case where any transaction is not detected, the communication station waits as it is. If the transaction has been detected, then the connection environment operation flag is set to the ON state (step S12), and thereafter it is determined whether the current radio network is in the dormant state (step S13). If the current radio network is not in the dormant state, processing is terminated. If the current radio network is in the dormant state, a network start signal is radio-transmitted (step S14).

Figure 9:
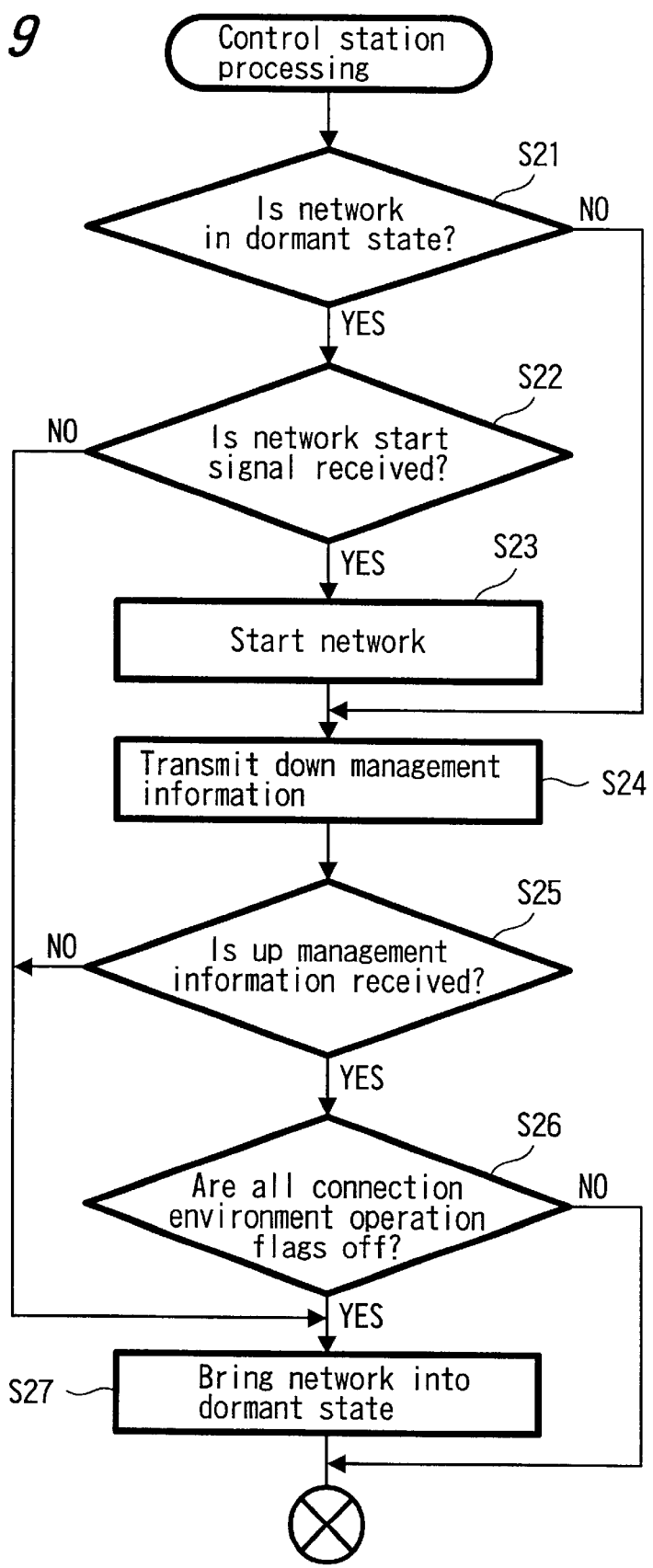
FIG. 9 is a flow chart showing an example of control station processing in a first transmission example in an embodiment according to the present invention.

By referring to the flow chart of FIG. 9, processing in the control station will now be described. In the control station, it is determined whether the network is in the dormant state (step S21). If the network is in the dormant state, it is determined whether the network start signal has been received (step S22). If the start signal has been received, then processing for starting the network is executed (step S23), and down management information is transmitted (step S24). Furthermore, also in the case where it is determined at the step S21 that the network is not in the dormant state, transmission processing of down management information is conducted at the step S24.

After the transmission of the down management information, it is determined whether the up management information has been received (step S25). If the up management information has been received, then it is determined whether the connection environment operation flag of every communication station within the network has turned OFF (step S26). If there is a station having a connection environment operation flag which is not in the OFF state, the control station waits as it is. If it is determined at the step S26 that the connection environment operation flag of every communication station has turned OFF, the start signal cannot be received at the step S22, or the up management information cannot be received at the step S25, then the network is brought into the dormant state and the down management information is not transmitted (step S27).

Figure 10:
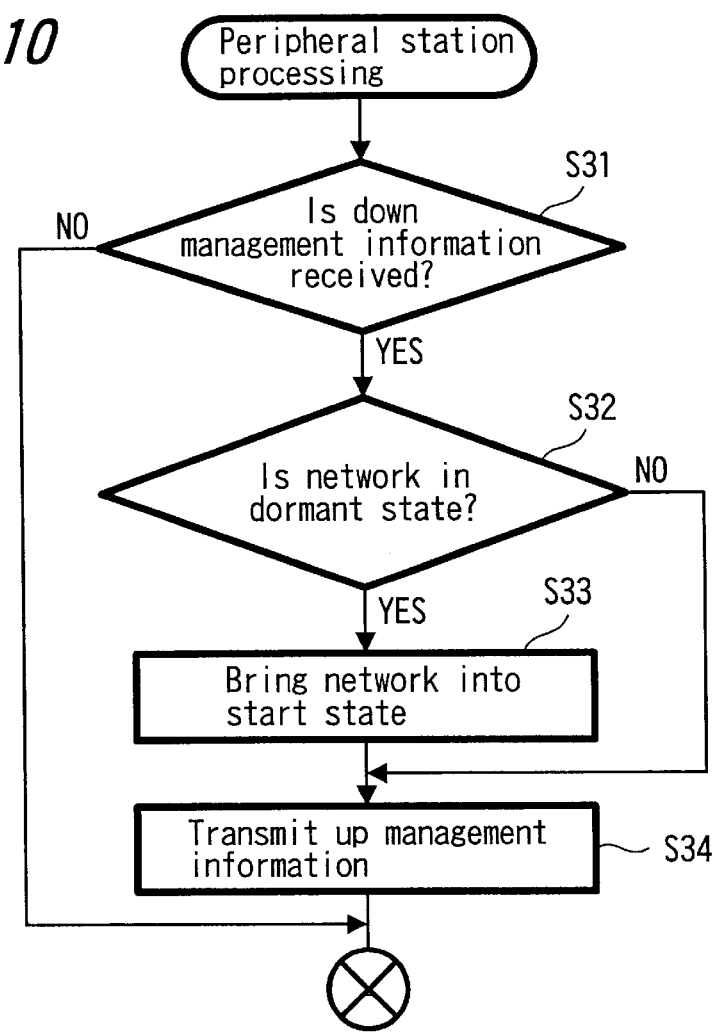
FIG. 10 is a flow chart showing an example of peripheral station processing in a first transmission example in an embodiment according to the present invention.

By referring to the flow chart of FIG. 10, processing in each terminal station will now be described. First of all, it is determined whether the down management information has been received from the control station (step S31). If the down management information has not been received, then each terminal station waits as it is. If the down management information has been received, then it is determined whether the network at this time is in the dormant state (step S32). If it is determined that the network is in the dormant state, then the network is judged to be in the start state (step S33) and the terminal station transmits the up management information to the control station (step S34). Furthermore, also in the case where it is determined at the step S32 that the network is not in the dormant state, the processing proceeds to the step S34 and the terminal station transmits the up management information to the control station.

Figure 11:
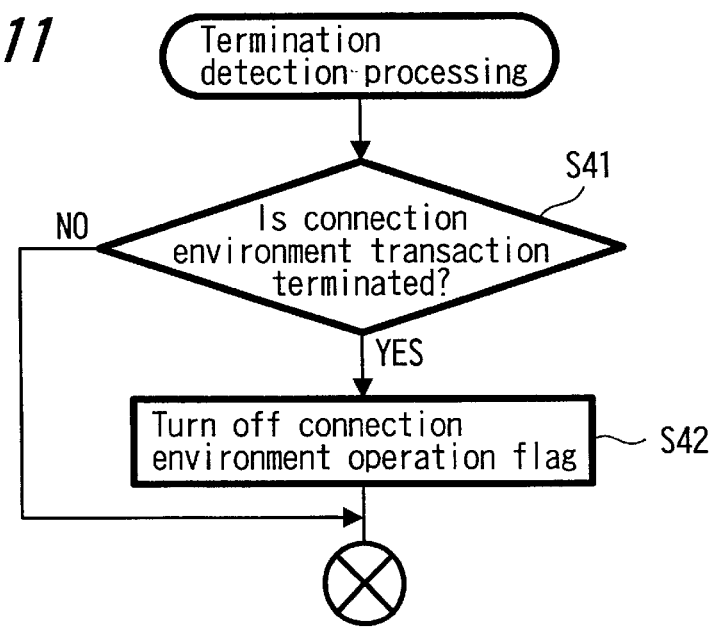
FIG. 11 is a flow chart showing an example of termination processing in a first transmission example in an embodiment according to the present invention.

By referring to the flow chart of FIG. 11, termination detection processing in each communication station within the network will now be described. First of all, it is determined whether the termination situation of the transaction in the device connected to the radio transmission device or the wire environment connected to the device has been received (step S41). In other words, it is determined whether some transaction has been detected as in the case where power of the connected device has been turned off or the case where it has become impossible to recognize a device on the serial bus line. Furthermore, also in the case where any information transmission is not conducted for a very long fixed time, the transaction may be judged to be terminated.

If termination is detected at the step S41, the connection environment operation flag of this station is set to the OFF state (step S42) to indicate that the transmission processing in this communication station has been terminated. The OFF state of the connection environment operation flag is transmitted to the control station as the up management information.

In this way, processing is conducted. Even in the case where the transmission processing in its own station has been terminated, therefore, it becomes possible to continue to start the radio network provided that there is a possibility of conducting transmission by using another communication station.

Figure 12:
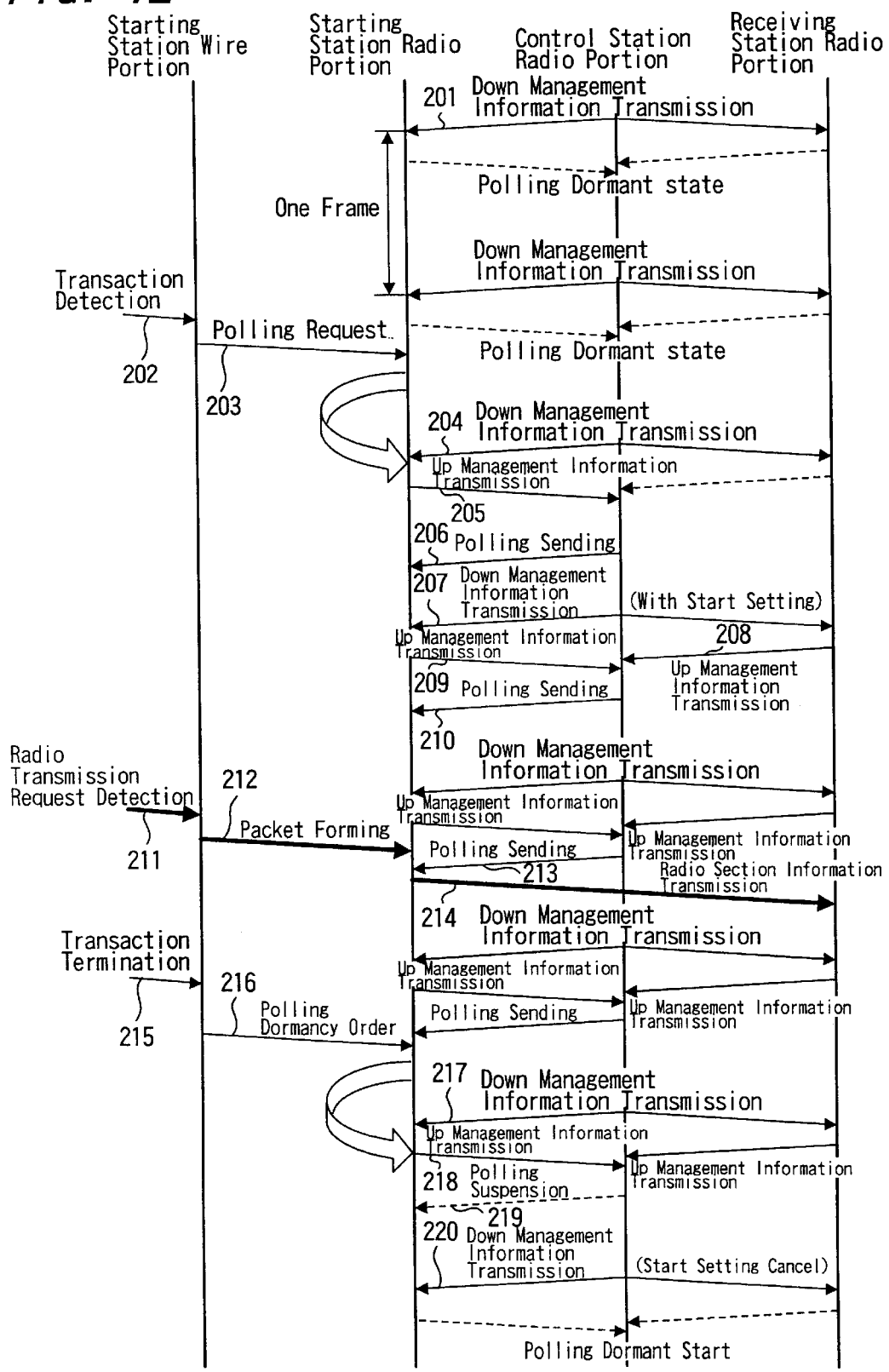
FIG. 12 is a time chart showing a second transmission example in an embodiment according to the present invention.
Figure 13:
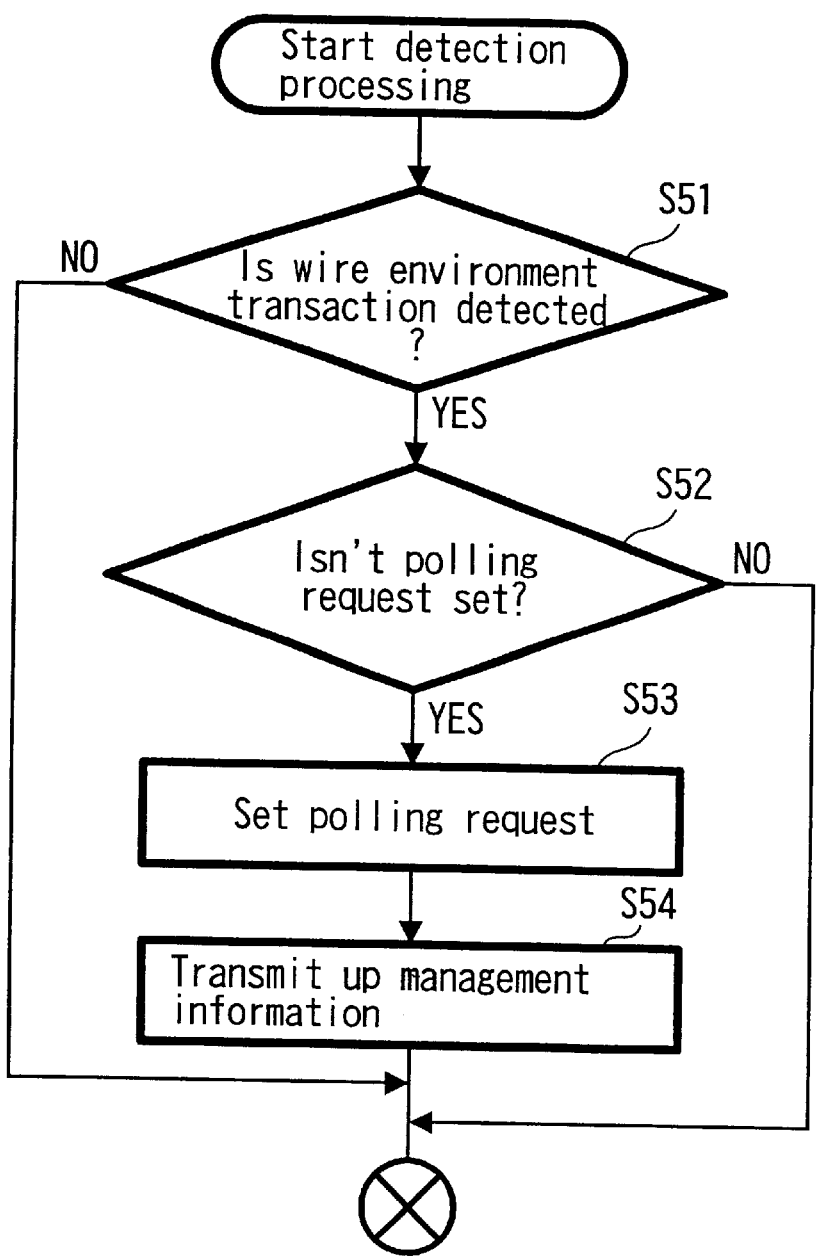
FIG. 13 is a flow chart showing an example of start processing in a second transmission example in an embodiment according to the present invention.

Another example (a second example) of transmission of a radio signal according to the embodiment will now be described. FIG. 12 is a diagram showing the communication state in the second transmission control example. In the example shown in FIG. 12 as well, information is radio-transmitted from one terminal station to another terminal station under the control of the central control station. In FIG. 12, there is also shown the state of a wire portion for receiving a signal from a device supplied with information, in a terminal station which transmits information. In the second transmission control example, the connection environment operation flag is not used for start control of the radio network. It is assumed in this example as well that respective communication stations in the network have already been registered with the control station via predetermined authentication processing and in addition various kinds of information such as station IDs of respective communication stations in the network have been registered with respective communication stations before the transmission shown in FIG. 12 is started.

In the case of the second transmission control example shown in FIG. 12, each communication station in the radio network conducts radio transmission in the polling control from the central control station. In the first state shown in FIG. 12, the control station conducts only transmission of the down management information 201 in the frame period, and the polling operation is in the dormant state. Each terminal station receives the down management information and waits.

It is assumed in this state that some transaction 202 occurs in a wire portion connected to a certain communication station and the transaction 202 is detected in the control section within the communication station. As this transaction, for example, some signal has been transmitted or a state change of a connected device has been detected on a serial bus line forming a wire transmission line. The transaction corresponds to detection of a stage before actual transmission of various kinds of information. At this time, the control section within this communication station gives an order 203 indicating that there is a transmission request. Subsequently, by using up management information 205 after transmission of down management information 204, a polling request signal is transmitted to the control station.

Upon distinguishing the polling request signal in the up management information 205, the control station immediately transmits a polling signal 206 to a pertinent station. When subsequently the control station transmits down management information 207, the management information is made to include information for starting the dormant network. As a result of this transmission of the down management information 207, up management information 208 and 209 are transmitted from all terminal stations within the network. Furthermore, in this frame interval as well, a polling signal 210 is transmitted. By repeating such operation at intervals of the frame period, the radio network is started, and connection of the radio network is established. Transmission of the polling signal may be started after the network has been started.

When an information transmission request 211 through the radio network has occurred in a wire portion connected to an operating terminal station, a transmission packet 212 is formed for a radio portion of that station, and conducts radio transmission 214 of the formed packet toward the other terminal station when a polling signal 213 has been transmitted to its own station.

When a wire portion of the starting terminal station has detected termination 215 of the transaction, there is given under the control of the control section of that station an order 216 indicating that the setting of the polling request has been canceled. At the time of transmission of up management information 218 which follows broadcast of down management information 217 in the next frame period, polling operation suspension information is transmitted. Upon receiving this information, the control station suspends the transmission of a polling signal 219 to this station. Furthermore, when transmitting down management information 220 in the next frame period, the down management information 220 is made to include information for canceling the start setting. Transmission of the up management information from each terminal station is also suspended, and the radio network is brought into a dormant state.

In the case of this example as well, the control station may be set so as to bring the radio network into the dormant state even in the case where there is no suspension order of the polling operation or in the case where there is a communication station disappearing from the radio network. In the example, detection of some transaction 202 and detection of the radio transmission request 211 are conducted at different time points. Even in the case where they are detected at the same time, however, radio transmission of information can be conducted in the same way by conducting the processing in order consecutively.

Examples of processing states in each communication station in the case where the above described transmission processing is executed will now be described by referring to flow charts of FIGS. 13 to 16. First of all, processing conducted in the starting communication station will now be described by referring to the flow chart of FIG. 13. In this communication station, it is determined whether occurrence of a transaction in a device connected to a radio transmission device or in a wire environment connected to such a device has been detected (step S51). In other words, for example, when power is supplied to the connected device, or when information is transmitted on the serial bus line, it is determined whether any transaction has been detected. In the case where any transaction is not detected, the communication station waits as it is. If the transaction has been detected, then it is determined whether a polling request is set (step S52). If it is determined that a polling request is not set, then the polling request is set (step S53) and up management information including the polling request information is transmitted (step S54).

Figure 14:
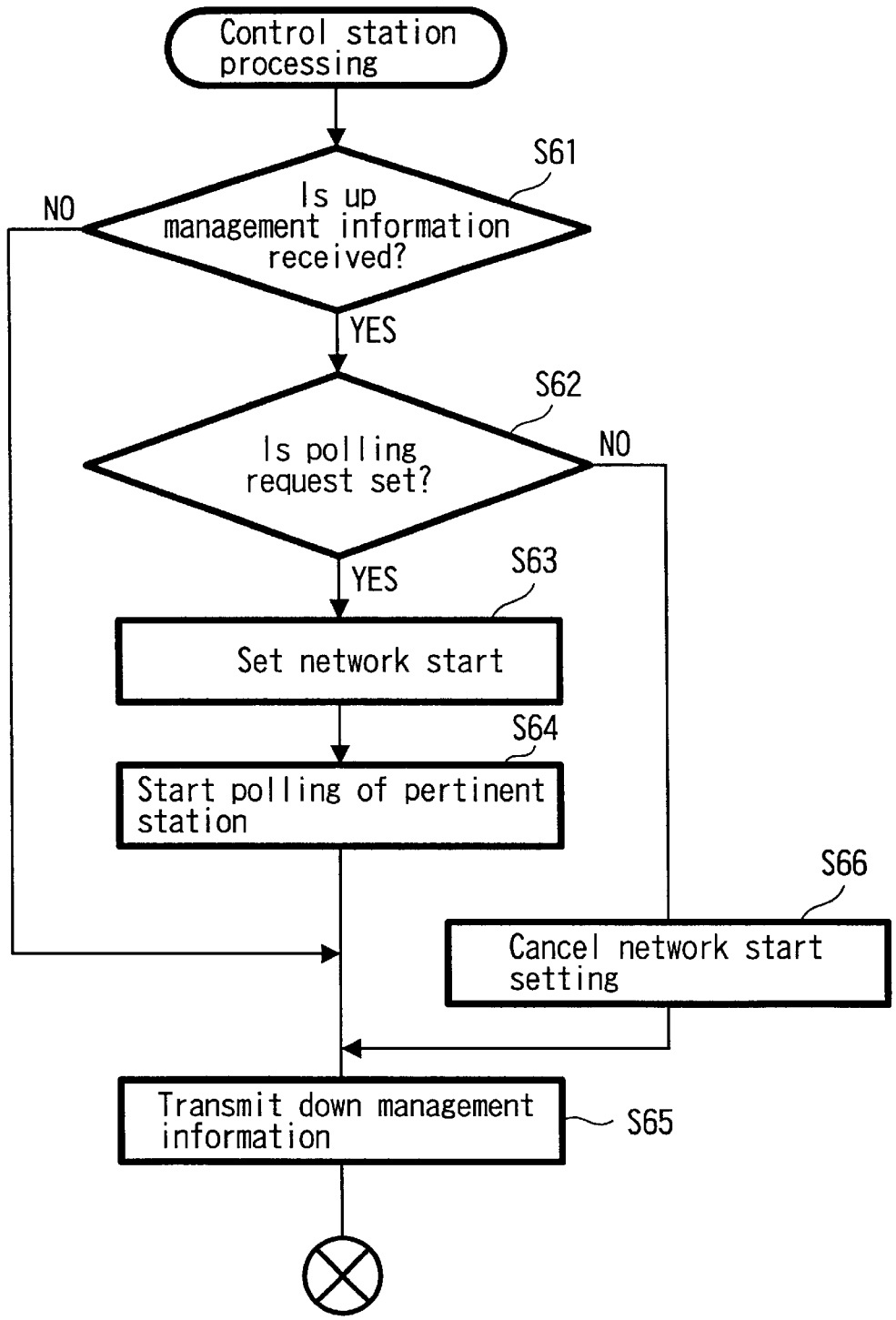
FIG. 14 is a flow chart showing an example of control station processing in a second transmission example in an embodiment according to the present invention.

By referring to the flow chart of FIG. 14, processing in the control station will now be described. First of all, it is determined whether up management information has been received from any terminal station (step S61). If up management information has been received, it is determined whether polling request information is included in the received management information (step S62). If the polling request information is included, then radio network start setting is conducted (step S63), and polling operation for the station subjected to the polling request is started (step S64). Furthermore, down management information including the start setting information is transmitted (step S65). If it is determined at the step S62 that polling request information is not included, then processing for canceling the network start setting is conducted (step S66), and down management information including start setting cancel information is transmitted at the step S65.

Figure 15:
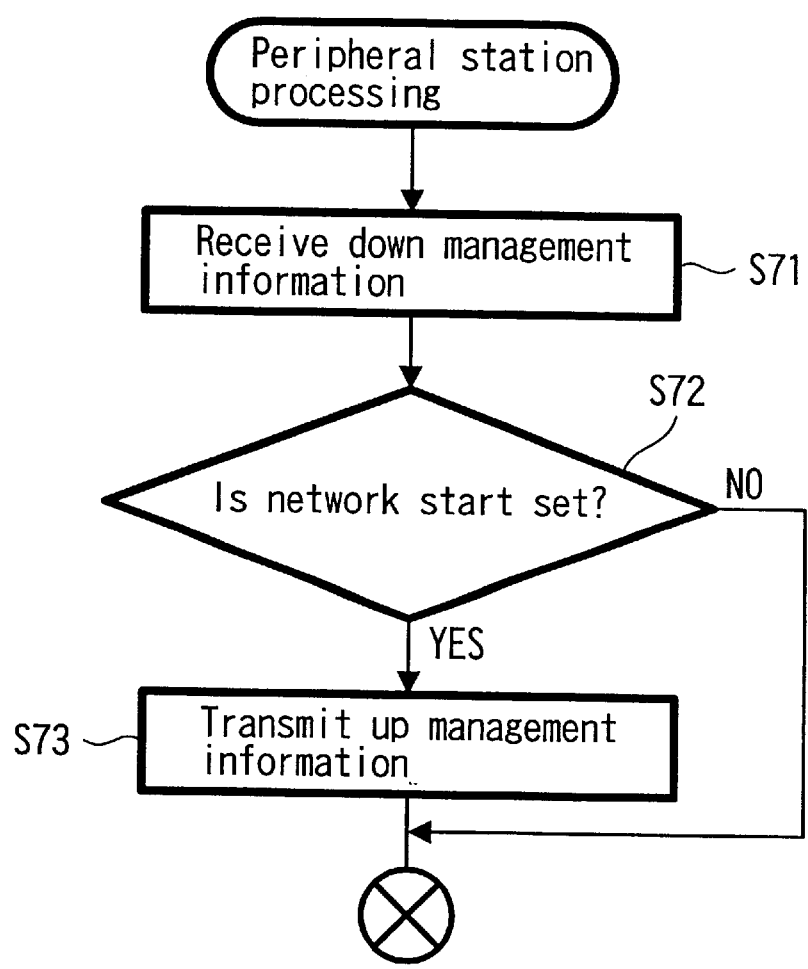
FIG. 15 is a flow chart showing an example of peripheral station processing in a second transmission example in an embodiment according to the present invention.

By referring to the flow chart of FIG. 15, processing in each terminal station will now be described. First of all, down management information from the control station is received (step S71). It is determined whether the received management information includes network start setting information (step S72). If network start setting information is not included, then each terminal station waits as it is. If the network start setting information has been detected, then it is determined that the network has been brought into the start state and up management information is transmitted to the control station (step S73).

Figure 16:
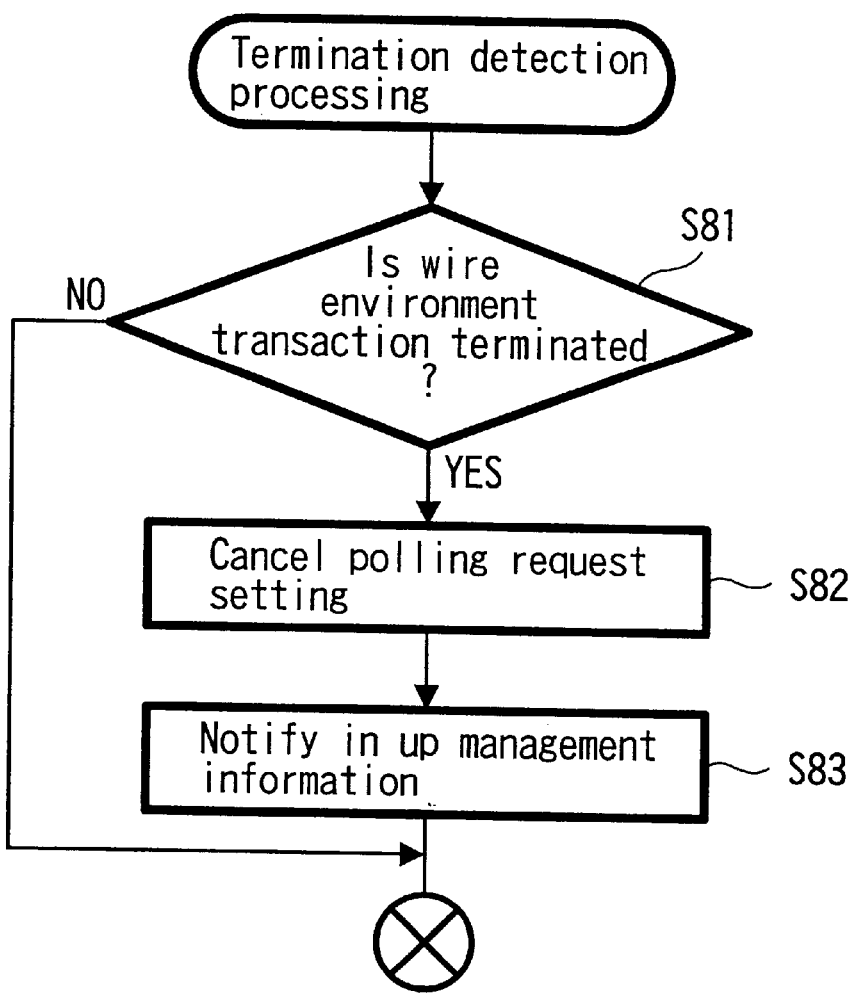
FIG. 16 is a flow chart showing an example of termination processing in a second transmission example in an embodiment according to the present invention.

By referring to the flow chart of FIG. 16, termination detection processing in each communication station within the network will now be described. First of all, it is determined whether the termination situation of the transaction in the device connected to the radio transmission device or the wire environment connected to the device has been received (step S81). In other words, it is determined whether some transaction has been detected as in the case where power of the connected device has been turned off or the case where it has become impossible to recognize a device on the serial bus line. Furthermore, also in the case where any information transmission is not conducted for a very long fixed time, the transaction may be judged to be terminated.

If termination is detected at the step S81, then the polling request setting from this station is canceled (step S82), and polling request setting cancel information is transmitted to the control station as the next up management information (step S83).

In this way, processing is conducted. Even in the case where the transmission processing in its own station has been terminated, therefore, it becomes possible to continue to start the radio network provided that there is a possibility of conducting transmission by using another communication station, in the same way as the case of the above described first transmission control example.

As heretofore described, radio network control is conducted in the processing of the embodiment. When information transmission is not required in the radio network, the network is brought into the dormant state. Only when there is a possibility of information transmission, the network is brought into the operation state. By minimum operation of the radio network, necessary information can be transmitted, and interference in the case where there is another radio network system in the vicinity can be suppressed to minimum. Furthermore, signals transmitted when transmission is not necessary are reduced. By that amount, power consumed by the whole radio network can be reduced.

As to the embodiment, there have been shown two examples, i.e., the first transmission control example in which the operation state and the dormant state of the radio network are controlled by using the connection environment operation flag, and the second transmission control example in which the operation state and the dormant state of the radio network are controlled by using the polling request information. However, processing other than these examples may also be used so long as the radio network can be brought into the operation state and the dormant state in the same way.

Furthermore, as for the configuration of the radio transmission device, the frame structure of the signal transmitted on the radio transmission channel, and the concrete configuration of the management information as well, the present invention is not limited to the above described examples.

In a radio transmission control method according to a first aspect of the present invention, a radio network comes in a dormant state when information transmission is not required in the radio network only when there is a possibility of information transmission, the radio network comes in an operational state. With minimum operation of the radio network, therefore, necessary information transmission can be conducted. In the case where there is another radio network system in the vicinity, interference can be suppressed to minimum.

In a radio transmission control method according to a second aspect of the present invention, in the first aspect, as detection of the possibility that any information transmission is conducted on the radio transmission channel, the possibility of information transmission on the radio transmission channel is detected from a state of a device connected to a pertinent communication station or a state of a wire transmission line for connection to the device. As a result, it becomes possible to start the radio network efficiently.

In a radio transmission control method according to a third aspect of the present invention, in the first aspect, when in detection of the possibility that any information transmission is conducted on the radio transmission channel, it is determined that there is not a possibility of information transmission on the radio transmission channel from a state of a device connected to a pertinent communication station or a state of a wire transmission line for connection to the device, the radio network is brought into a dormant state. As a result, setting for bringing the radio network into the dormant state can be conducted favorably. By that amount, power consumed in the whole radio network can be reduced.

In a radio transmission control method according to a fourth aspect of the present invention, polling operation is conducted only when there is a possibility that each of the stations included in the radio network transmits information. With minimum polling operation, necessary information transmission is conducted. When there is no transmission demand, it becomes possible for another radio system to use the asynchronous transmission channels. As a result, it becomes possible to use the prepared transmission band efficiently.

In a radio transmission control method according to a fifth aspect of the present invention, in the fourth aspect, each of the communication stations judges a transmission demand based on a state of a device connected to a pertinent communication station or a state of a wire transmission line for connection to the device, and transmits a polling request signal. As a result, it becomes possible to start the radio network efficiently.

In a radio transmission control method according to a sixth aspect of the present invention, in the fourth aspect, the radio transmission channel is time-divided, and an asynchronous information transmission region and a management information transmission region are set, and the polling request signal is transmitted in the management information transmission region. As a result, polling request signals can be transmitted while using radio transmission channels efficiently.

In a radio transmission control method according to a seventh aspect of the present invention, each of stations is set into a dormant state if radio transmission is not conducted on the radio transmission channel for a fixed time, or if there is no change in existence of each of the communications stations after the network is brought into the operation state and information transmission is conducted. As a result, the network can be automatically brought into the dormant state. The power dissipation can be reduced.

In a radio transmission device according to a eighth aspect of the present invention, a radio network comes in a dormant state when information transmission is not required in the radio network. Only when there is a possibility of information transmission, the radio network comes in an operational state. Therefore, there are obtained transmission devices capable of forming such a radio network system that necessary information transmission is conducted with minimum operation of the radio network.

In a radio transmission device according to a ninth aspect of the present invention, in the eighth aspect, the detection means detects the state of information supply or the state of a device connected based on a signal state of a transmission line connected to the input means. As a result, it becomes possible to start the radio network including the radio transmission device efficiently.

In a radio transmission device according to a tenth aspect of the present invention, there are obtained transmission devices capable of forming such a radio network system that necessary information transmission is conducted with minimum polling operation.

In a radio transmission device according to an eleventh aspect of the present invention, in the tenth aspect, the detection means detects the state of information supply or the state of a device connected based on a signal state of a transmission line connected to the input means. As a result, setting for bringing the radio network into the dormant state can be conducted favorably. By that amount, power consumed in the whole radio network can be reduced.

In a radio transmission device according to an twelfth aspect of the present invention, in the tenth aspect, a radio transmission channel whereby the radio communication means conducts communication is divided, an asynchronous information transmission region and a management information transmission region are set, and the polling request signal from the radio communication means is transmitted in the management information transmission region. As a result, there is obtained a transmission device capable of transmitting polling request signals while using radio transmission channels efficiently.

In a radio transmission device according to a thirteenth aspect of the present invention, the radio transmission device itself conducts only minimum polling operation. As a result, such a radio network system that necessary information transmission is conducted with minimum polling operation can be formed.

In a radio transmission device according to a fourteenth aspect of the present invention, each of stations is set into a dormant state if radio transmission is not conducted on the radio transmission channel for a fixed time, or if there is no change in existence of each of the communications stations after the network is brought into the operation state and information transmission is conducted. As a result, there is obtained such a transmission device that the network can be automatically brought into the dormant state and the power dissipation can be reduced.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A radio transmission control method for conducting communication on a predetermined radio transmission channel using asynchronous transmission under control of a control station in a wireless radio network including one control station and a plurality of wireless communication stations capable of radio communicating with the control station, said radio transmission control method comprising the steps of:

inhibiting a polling operation conducted from said control station to each communication station on the network by bringing each communication station on the network into a dormant state so as to reduce power consumption of each communication station in the dormant state;

transmitting a request signal to said control station when a transmission demand has occurred in each of said plurality of communication stations and bringing said plurality of communication stations into an operation state from the dormant state upon the occurrence of the transmission demand; and starting to conduct the polling operation conducted from the control station when the control station has received the polling request signal, wherein each of said communication stations judges a transmission demand based on a state of a device connected to one of said plurality of communication stations or a state of a wire transmission line for connection to the device, and transmits the request signal.

2. A radio transmission control method for conducting communication on a predetermined radio transmission channel using asynchronous transmission under control of a control station in a radio network including one control station and a plurality of communication stations capable of radio communicating with the control station, said radio transmission control method comprising the steps of:

inhibiting a polling operation conducted from said control station to each communication station on the network, in a steady state;

transmitting a request signal to said control station when a transmission demand has occurred in each of said plurality of communication stations;

starting to conduct the polling operation conducted from the control station when the control station has received the request signal;

time dividing said radio transmission channel into an asynchronous information transmission region and a management information transmission region, and transmitting the request signal in said management information transmission region.

3. A radio transmission device comprising:

radio communication means for conducting transmission and reception of radio signals with a device in a wireless radio network based on a polling signal;

input means for inputting information to be transmitted by said radio communication means;

detection means for detecting a state of information supply to said input means or a state of a device connected to said input means; and control means for determining whether a communication demand is occurring based on said detecting of said detection means, and for causing said radio communication means to transmit a request signal to a transmission source of said polling signal in response to a determination that a communication demand has occurred, wherein said radio communication means is brought from a dormant state of reduced power consumption to an operative state upon the determination that the communication demand has occurred, wherein a radio transmission channel whereby said radio communication means conducts communication is divided into an asynchronous information transmission region and a management information transmission region, and said request signal from said radio communication means is transmitted in said management information transmission region.

* * * * *